(12) United States Patent
Nunes et al.

(10) Patent No.: US 6,350,072 B1
(45) Date of Patent: Feb. 26, 2002

(54) PRINTER WITH PLURAL MODE INTEGRAL MODULE FOR DOCUMENT HANDLING PRINT OUTPUT AND PRINT DUPLEX INVERSION

(75) Inventors: Vicente P. Nunes, Mississauga; Gary A. Faguy, Hamilton, both of (CA)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/511,752

(22) Filed: Feb. 24, 2000

(51) Int. Cl.[7] .................................................. B41J 3/60
(52) U.S. Cl. ........................ 400/188; 101/230; 271/186; 271/275; 271/902; 355/23; 355/24; 399/364; 399/373; 399/374
(58) Field of Search .......................... 400/188, 189, 400/190; 271/184, 185, 186, 225, 65, 301, 902, 291; 355/23, 24; 399/364, 373, 374, 401; 101/229, 230, 231

(56) References Cited

U.S. PATENT DOCUMENTS

| 4,234,180 A | | 11/1980 | Looney ....................... 271/3.1 |
|---|---|---|---|
| 4,928,128 A | * | 5/1990 | Stemmle ..................... 399/364 |
| 4,990,965 A | * | 2/1991 | Kiya ........................... 399/402 |
| 5,225,881 A | * | 7/1993 | Goto et al. .................. 399/402 |
| 5,303,017 A | | 4/1994 | Smith ......................... 355/318 |
| 5,448,348 A | * | 9/1995 | Azeta ......................... 399/364 |
| 5,791,645 A | * | 8/1998 | Takada .................... 271/186 X |
| 5,850,581 A | | 12/1998 | Roller ............................ 399/2 |
| 6,168,327 B1 | * | 1/2001 | Tsuzuki ...................... 400/188 |

* cited by examiner

*Primary Examiner*—Ren Yan
*Assistant Examiner*—Minh H. Chau

(57) ABSTRACT

In a printer with a print engine having simplex and duplex sheet printing functions, and simplex and duplex sheet feeding paths, and at least one sheet output path, a plural function module is mounted on top of the print engine. This plural function module provides a document handling unit for feeding original documents to be imaged, and also provides a reversible sheet feeding path operatively communicating with the duplex sheet feeding path of the print engine to provide a space savings printed sheet reversing chute which is outside of the print engine for the duplex printing function. This reversible sheet feeding path in the module is alternately operable unidirectionally to provide an arcuate, inverting, sheet output path to a sheet output stacking tray which may be located on top of the plural function module.

6 Claims, 2 Drawing Sheets

Figure 1:
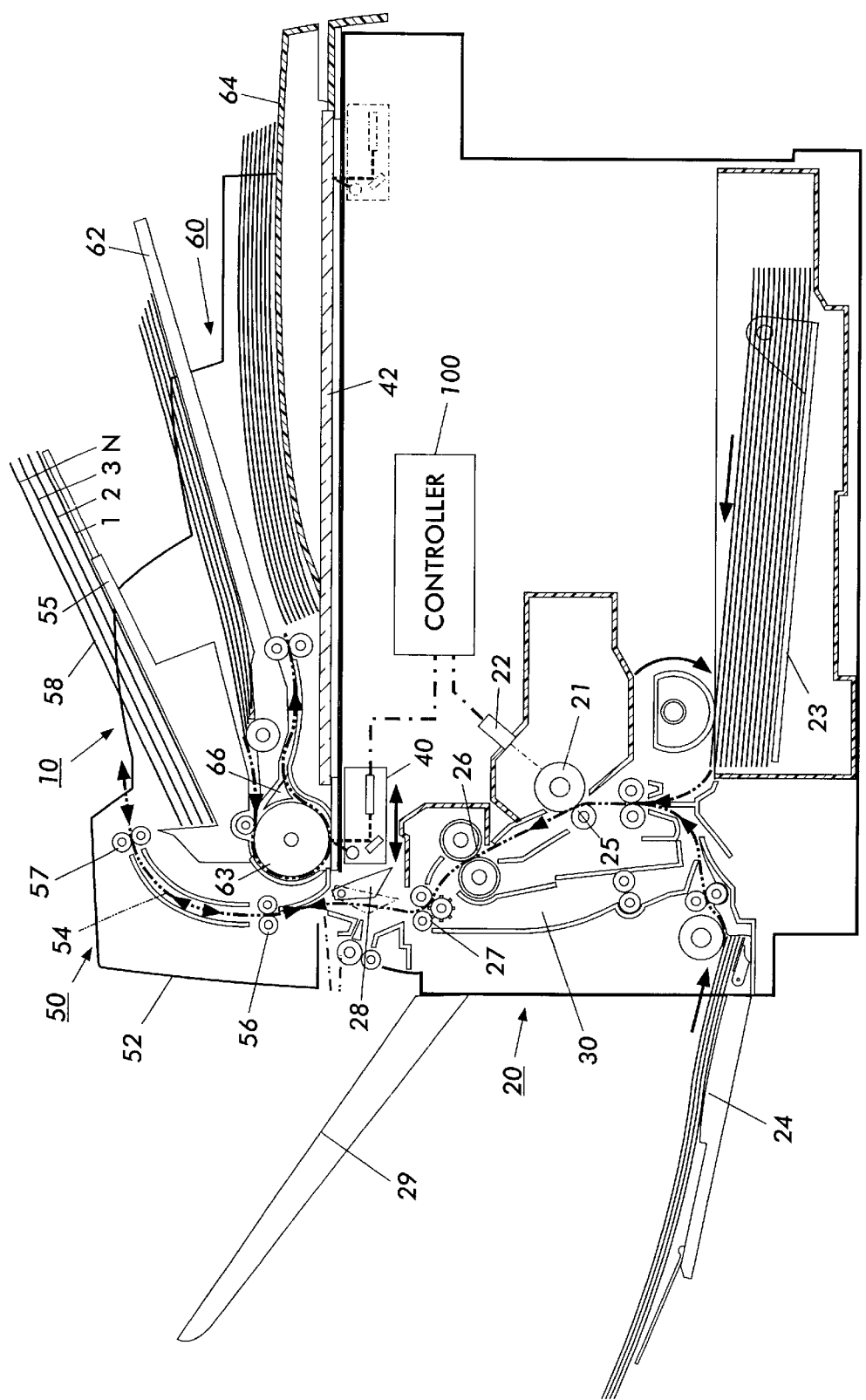

PRINTER WITH PLURAL MODE INTEGRAL MODULE FOR DOCUMENT HANDLING PRINT OUTPUT AND PRINT DUPLEX INVERSION

Cross-reference is made to an application having the same inventors, assignee and filing date; now U.S. Pat. No. 6,304,742, issued Oct. 16, 2001.

Providing more compact and lighter weight printers is particularly desirable for printers for office and home use. Disclosed in the embodiments herein is a highly compact system in which a single integral printer module provides plural sheet handling functions in the same module and space, for reduced space requirements, sharing both copy sheet and document handling functions in the same module.

In particular, there is disclosed in the embodiment herein a compact separable module mountable on top of a printer print engine capable of providing the following different sheet functions within the same compact module: a document handling system for automatically feeding original sheets to be imaged from a stacking tray and returning them to another tray after imaging; an integral copy sheets inverter system providing (in cooperation with the print engine) a major paper path component of an automatic duplexing system within the same module; a copy sheet output path within the same module sharing the same paper path; and a copy sheet exit stacking tray on said same module for output stacking of printed copy sheets via the same copy sheet output path.

It may be seen from the disclosed embodiment that this copy sheet output stacking tray of this disclosed modular embodiment may be desirably provided at the very top of the overall printer unit, for user convenience in unobstructively observing and removing finished printed sheets. As shown, this copy sheet stacking tray may be desirably mounted superposed over both the document input and document output stacking trays of the document handler of this same module, thus not requiring any increase in the overall machine "footprint," or desk space.

Furthermore, the copy sheet output stacking tray of this plural mode module embodiment can be an alternative output tray relative to another output tray desirably provided with a different sheet stacking orientation. That is, the copy sheet output path within the module leading to the copy sheet output stacking tray can desirably have an arcuate sheet path (desirably shared with the inverter sheet path), and that copy sheet output path may desirably be different from another copy sheet output path from the printer to another, side, output, tray, so as to provide a different number of natural sheet path inversions, and thereby desirably provide a choice of sheet stacking outputs suitable for properly collated face up or face down output sheet stacking, for 1 to N or N to 1 sheet order printing, and simplex or duplex sheet printing.

The use of various modular components in printers (this term as used herein broadly includes copiers, multifunction, and other reproduction machines) is well known to those in that art. One example is shown in Xerox Corp. U.S. Pat. No. 5,850,581 issued Dec. 15, 1998 to George J. Roller, Attorney Docket No. D/96568, and other art cited therein. Others are provided in printers with print engines similar to the example shown in the embodiment herein, such as Xerox Corp. U.S. Pat. Nos. 5,835,823; 5,784,671; 5,778,284; 5884,123; and 5,881,340.

It has been well know for many years to provide a document handling module on top of copiers or other printers, for feeding image bearing sheets from a stack thereof to be imaged for one or more of electronic image storage, electronic transmission, faxing, local or remote printing, direct copying, etc,. An example is Xerox Corp. U.S. Pat. No. 5,534,989 issued Jul. 9, 1996 to Robert F. Rubscha, et al, Attorney Docket No. D/95103, and other art cited therein. Various other types of document (original sheets) feeding systems are also known in the art, such as Xerox Corp. U.S. Pat. No. 4,234,180 to Looney (D/79116). The present plural mode module and system is not limited to details of a specific document handling system.

However, such prior art document handling modules were limited in function to handling the original document sheets, per se, and did not compatibly provide the other valuable printer functions within the same modular unit and space as disclosed herein.

Further by way of background, it is know in the art, as described for example in prior Xerox Corp. U.S. Pat. Nos. 5,749,024; 5,215,298; 4,459,013; to be desirable (to provide proper page order collation) to output stack copy sheets face down if they are printed in forward or 1 to N order, and to output stack copy sheets face up if they are printed in reverse or N to 1 order. It is likewise known to provide two different output paths and output trays for this purpose, to accommodate either printing order, or for optimal simplex or duplex printing orders. It is also well known to feed the original documents with a document handler to a copier, scanner, or facsimile machine in 1 to N order, from the top of a face-up stack, as shown in various of the above-cited document handler patents, or from the bottom of a face down stack. However, some other copiers such as that described for example in Xerox Corp. U.S. Pat. No. 4,278,344, and some other scanner or multifunction systems, feed the original documents from the bottom of a face up stack, which feeds the sheets to be imaged in N to 1 order. Thus, especially for a networked printer mode of operation, it is known to be desirable to be able to accept electronic documents in either order, without having to use a copy sheet reversing type of output path inverter, i.e. to have two different copy sheet output paths, one of which provides a natural inversion in the output path relative to the other.

Various sheet inverting systems with sheet reversing chutes for duplexing are known in the art, for copies or documents, including, for example, gateless or Mylar flap gated inverters with curved baffles defining the reversing chute so as to flip the trail edge over to the inverter exit rolls. E.g., Xerox Corp. U.S. Pat. No. 5,303,017 issued Apr. 12, 1994 (D/92357).

A specific feature of the specific embodiment disclosed herein is to provide in a printing apparatus with a print engine having simplex and duplex sheet printing functions, having simplex and duplex sheet feeding paths, and having at least one sheet output path, said printing apparatus also having a document handling unit for feeding documents to be imaged, the improvement comprising: a plural function module mounted to said print engine, said plural function module containing said document handling unit, and said plural function module further containing a reversible sheet feeding path operatively communicating with said duplex sheet feeding path of said print engine to provide a sheet reversing path for said duplex sheet printing function of said print engine, said reversible sheet feeding path being outside of said print engine and within said plural function module to provide overall space savings.

Further specific features disclosed in the embodiment herein, individually or in combination, include those wherein said reversible sheet feeding path is operable unidirectionally to alternatively provide a sheet output path in said plural function module; and/or wherein said sheet output path is arcuate to provide an inverted sheet output from said sheet output path of said plural function module; and/or wherein said plural function module has an sheet output stacking tray operatively connected to said sheet output path; and/or wherein said sheet output stacking tray is exposed on top of said plural function module.

The disclosed system may be operated and controlled by appropriate operation of conventional control systems. It is well known and preferable to program and execute imaging, printing, paper handling, and other control functions and logic with software instructions for conventional or general purpose microprocessors, as taught by numerous prior patents and commercial products. Such programming or software may of course vary depending on the particular functions, software type, and microprocessor or other computer system utilized, but will be available to, or readily programmable without undue experimentation from, functional descriptions, such as those provided herein, and/or prior knowledge of functions which are conventional, together with general knowledge in the software or computer arts. Alternatively, the disclosed control system or method may be implemented partially or fully in hardware, using standard logic circuits or single chip VLSI designs.

The term "printer" or "reproduction apparatus" as used herein broadly encompasses various printers and/or copiers or multifunction machines or systems, xerographic or otherwise. The term "sheet" herein refers to a usually flimsy physical sheet of paper, plastic, or other suitable physical substrate for images, whether precut or web fed. A "copy sheet" may be abbreviated as a "copy" or called a "hardcopy". A "print job" is normally a set of related sheets, usually one or more collated copy sets copied from a set of original document sheets or electronic document page images, from a particular user, or otherwise related. A "simplex" document or copy sheet is one having its image and any page number on only one side or face of the sheet, whereas a "duplex" document or copy sheet has "pages", and normally images, on both sides, i.e., each duplex sheet is considered to have two opposing image sides or "pages" even though no physical page number may be present. An "original" may of course be a previously printed copy sheet.

As to specific components of the subject apparatus or methods, or alternatives therefor, it will be appreciated that, as is normally the case, some such components are known per se in other apparatus or applications which may be additionally or alternatively used herein, including those from art cited herein. All references cited in this specification, and their references, are incorporated by reference herein where appropriate for teachings of additional or alternative details, features, and/or technical background. What is well known to those skilled in the art need not be described herein.

Figure 2:
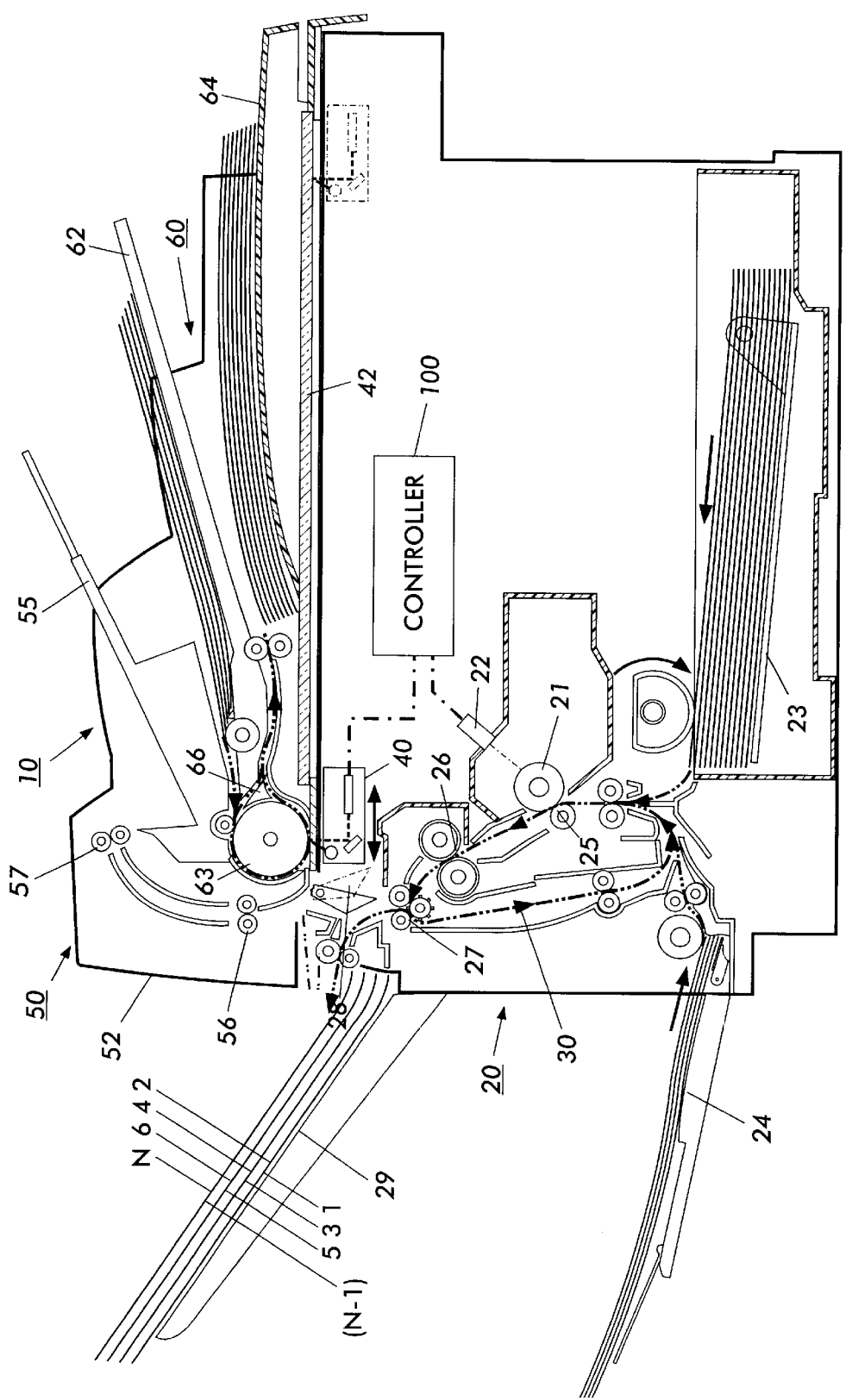

Various of the above-mentioned and further features and advantages will be apparent to those skilled in the art from the specific apparatus and its operation or methods described in the example below, and the claims. Thus, the present invention will be better understood from this description of this specific embodiment, including the drawing figures (which are approximately to scale) wherein:

FIG. 1 is a partially schematic frontal view of an exemplary printer with a print engine specially adapted to be operatively cooperatively engaged with a example of the subject plural function module mounted thereon, and shown operating in a first mode of operation; and FIG. 2 is the same view of the same printer and plural function module of FIG. 1, but illustrating a different mode or step of operation.

Describing now in further detail the exemplary embodiment with reference to the Figures, there is shown a reproduction system 10, by way of one example of an application therewith of the subject plural mode module therewith. This specific disclosed embodiment of a reproduction system is a multi-function digital printer 10 with a print engine 20 such as is disclosed in the above-cited Xerox Corp. U.S. Pat. Nos. 5,835,823; 5,784,671; 5,778,284; 5884,123; and 5,881,340.

The illustrated print engine 20 is an otherwise general conventional xerographic print engine having a photoreceptor 21 imaged by a scanning laser or other imaging system 22. Copy sheets to be printed are fed from a copy paper supply (cassette) 23, or an alternate paper input 24, to an image transfer station 25 with the photoreceptor 21, then to a fuser 26 which feeds the printed sheet on to one nip of a two nip tri-roll sheet feeder 27. The printed sheet is fed on from the sheet feeder 27 to a paper path decision gate 28. There are two illustrated conventional copy sheet inputs to the print engine 20, the integral paper tray or cassette 23 and the external bypass tray input 24, but it is well know to have others.

When this gate 28 is in its illustrated solid line position of FIG. 2 (versus its illustrated dashed-line or phantom position of FIG. 1), the printed sheet is then deflected directly out of the side of the print engine 20 through conventional exit rolls to individually stack last printed sides up in a side output sheet stacking tray 29. FIG. 2 illustrates in this side output stacking tray 29 a stack of duplex printed sheets printed in 1 to N page order with their second sides printed after their first sides and printed with the next highest page number, so as to stack as a completed document set, face down in properly collated order.

As will be further described below with reference to the plural function module 50 which forms an operative part thereof, the print engine 20 also has a duplex loop (return) path 30, illustrated in FIG. 1 by a dashed line with movement arrowheads. This duplex path 30 provides for optional duplex sheet printing by feeding a sheet printed on one side around to the photoreceptor 21 again to print a second side image on the opposite side of that sheet, which duplex printed sheet may then be outputted to side tray 29 as described above and shown in FIG. 2. That is, for duplex printing here, sheets initially printed on one side (their first side) are fed past the decision gate 28 (in the illustrated solid-line position of that gate in FIG. 1) up into the module 50, reversed therein, and returned by the module 50 back to the other nip of the tri-roll feeder 27, which feeds the sheet down into this duplex loop path 30.

Also illustrated in this example as an integral part of the print engine 20 is a conventional digital image input scanner 40 mounted under a conventional imaging platen 42. As shown here, and further described in the above-cited U.S. Pat. No. 5,534,989, etc., the scanner 40 may be stationarily parked under the imaging station of a moving documents input system provided by a document handler, as illustrated by its solid line position, or moved along under the platen 42 to image stationary documents thereon, as illustrated by the phantom line position of the scanner 40.

The print engine 20 or the entire printer 10 may be conventionally controlled by a controller 100, as indicated above.

Turning now to the subject of particular interest here, this is the exemplary plural function separate module 50 mountable on top of the print engine 20. This exemplary plural mode module 50 integrally provides several different sheet handling functions within its same compact space under its same external covers 52. Specifically, in this example:

(a) An integral document handling unit 60 for feeding original documents from a stack thereof in a document input tray 62 to a large diameter document imaging drum 63, such an elastomer covered aluminum cylinder, providing a constant velocity transport (CVT) moving the document over the image input scanner 40 and then feeding the document on out to stack in a document output tray 64 under the input tray 62. For duplex documents, a duplex documents gate 66 and reversible document exit rollers to the tray 64 (as described in the above-cited document handling U.S. Pat. No. 5,850,581 and other patents cited therein), can be used to invert and return duplex documents for second side imaging in the same manner, (b) An integral copy sheets inverter system, provided by a reversible dual mode sheet paper path 54 with reversible sheet path drive rollers 56 and 57 providing sheet inversion by sheet motion reversal, with this reversible paper path 54 providing the sheet inversion path or chute of a sheet inverter in cooperation with a simple operatively connecting but separable sheet path connection to the duplex path 30 of the print engine 20, (c) A copy sheet output path provide by unidirectional downstream motion operation of the same paper path 54 and its feed rollers 56 and 57. The rollers 57 in this mode provide output or exit feed rolls from the upper end of the sheet path 54 to a copy sheet output tray 55 which is on top of the module 50 and the entire printer 10, and, (d) A top output copy sheet output stacking tray 55 providing for face-down (last printed side down) stacking of printed copy sheets, in an easily visible and removable sheet stack 58, via the copy sheet output path provided by the dual mode paper path 54.

As indicated, this plural function module 50 integrally includes the dual mode paper path 54 (copy sheet inverter path and copy sheet output path) within a single module that would normally only contain just the document (originals) handler unit 60. Available otherwise unused space is thus utilized within the same single unit, all safely enclosed under the same external covers 52.

This is in contrast to prior art printer systems requiring substantial additional space inside of the print engine 20 itself for such a sheet inversion path or chute, since a sheet inversion path or chute must accommodate the length of the longest sheet to be inverted. Since most copier or multi-function machines have such a top mounted document handling module unit, this concept is applicable to various other such reproduction machines in addition to the example illustrated herein.

All of this is fully compatible with the normal functioning of the original document handling system 60 of this plural mode module 50, which can simultaneously provides feeding and imaging of original document sheets from the document entrance stacking tray 62 to the document exist or output stacking tray 64 thereunder. That is, the feeding paths and the stacking trays 62 and 64 for original documents here are all separate from any of the copy sheet paths and any of the copy sheet stacking trays. Yet, the copy sheet exit stacking tray 55 of this plural mode module 50 is desirably on top, overlying, superposed over, the two stacking trays 62 and 64 for original documents for easy retrieval of the stack of sheets 58 therefrom.

To recap, the integral copy sheets inverter system 54, 56, 57 here utilizes the same paper path 54 in a dual mode function, alternately being used for a copy sheet output path to the top output tray 55. That is, those copy sheets selected by the controller 100 as having been programmed to be duplex printed are inverted in this paper path 54 by being gated by gate 28 into, and fed up all of the way into, this path 54 and then reversed by conventional reversible servomotor, stepper motor or clutch reversal of the drives of the reversible feed rolls 56 and 57, which may be simple conventional pinch roller sets. Thus, instead of outputting that sheet fully into the alternate copy sheet stacking tray 55 (as noted below, it may extend partially out therein), that sheet is reverse driven to be fed back down the same path back and into the duplex path loop 30 of the print engine 20 for its second side printing. To express that another way, the plural mode module 50 takes the printed face up output from a top sheet exit from the print engine 20 (from the fuser 26 and the first nip of the feed rollers 27 of the print engine 20), drives the sheet fully into an arcuate sheet inversion chute or pocket formed by the sheet path 54 within the module 50, and reverses direction to exit the sheet from the module 50 back to the same opening in the top of the print engine 20, which provides a print engine 20 sheet re-entrance path, all in the proper sequence for duplexing.

For large copy sheets, such as U.S. legal size (8.5"=14") fed lengthwise, part of the space over the alternate copy sheet stacking tray 55 is also part of the copy sheet inverter system. That is, the lead edge area of large sheets is fed out over and partially into the tray 55 by exit rolls 57 before such large sheets are reversed for duplexing. That allows the large copy sheets reverse movement for inversion to starts after the trail edge of that sheet has fully cleared the fuser and the tri-roll feeder 27.

For copy sheets (copies or prints) being simplex printed in reverse or N to 1 order, the side exit tray 29 (which, in this system has an exit below the subject plural mode module) may be used for properly collated direct face up sheet stacking, directed by the gate 28.

While the embodiment disclosed herein is preferred, it will be appreciated from this teaching that various alternatives, modifications, variations or improvements therein may be made by those skilled in the art, which are intended to be encompassed by the following claims.

What is claimed is:

1. In a printing apparatus with a print engine having simplex and duplex sheet printing functions, having simplex and duplex sheet feeding paths, and having at least one sheet output path, said printing apparatus also having a document handling unit for feeding documents to be imaged, the improvement comprising:

a plural function module mounted to said print engine, said plural function module containing said document handling unit, and said plural function module further containing a reversible sheet feeding path operatively communicating with said duplex sheet feeding path of said print engine to provide a sheet reversing path for said duplex sheet printing function of said print engine, said reversible sheet feeding path being outside of said print engine and within said plural function module to provide overall space savings.

2. The printing apparatus of claim 1, wherein said reversible sheet feeding path is operable unidirectionally to alternatively provide a sheet output path in said plural function module.

3. The printing apparatus of claim 2, wherein said sheet output path is arcuate to provide an inverted sheet output from said sheet output path of said plural function module.

4. The printing apparatus of claim 2, wherein said plural function module has an sheet output stacking tray operatively connected to said sheet output path.

5. The printing apparatus of claim 4, wherein said sheet output stacking tray is exposed on top of said plural function module.

6. The printing apparatus of claim 1, wherein said said document handling unit of said plural function module has an original document input tray, an original document output tray, and an original document transport path system between said input tray and said output tray for transporting original documents for imaging, which original document transport path system is separate from said reversible sheet feeding path operatively communicating with said duplex sheet feeding path of said print engine to provide a sheet reversing path for said duplex sheet printing function of said print engine.

* * * * *